May 10, 1927.

T. CRAWFORD

UNIVERSAL PULLEY

Filed Sept. 29, 1926

Inventor.
Thomas Crawford
by his Attorneys.
Howson & Howson

May 10, 1927.
T. CRAWFORD
1,628,491
UNIVERSAL PULLEY
Filed Sept. 29, 1926  3 Sheets-Sheet 2
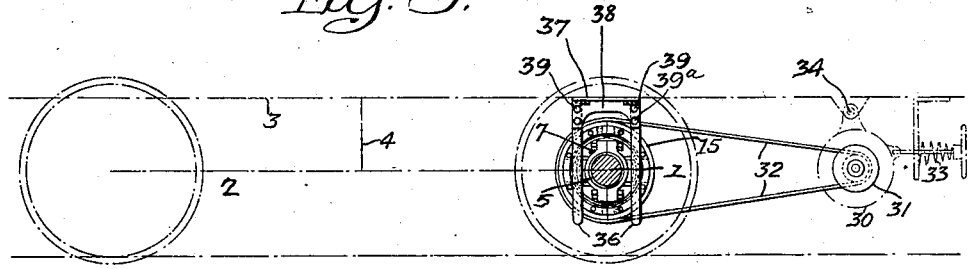
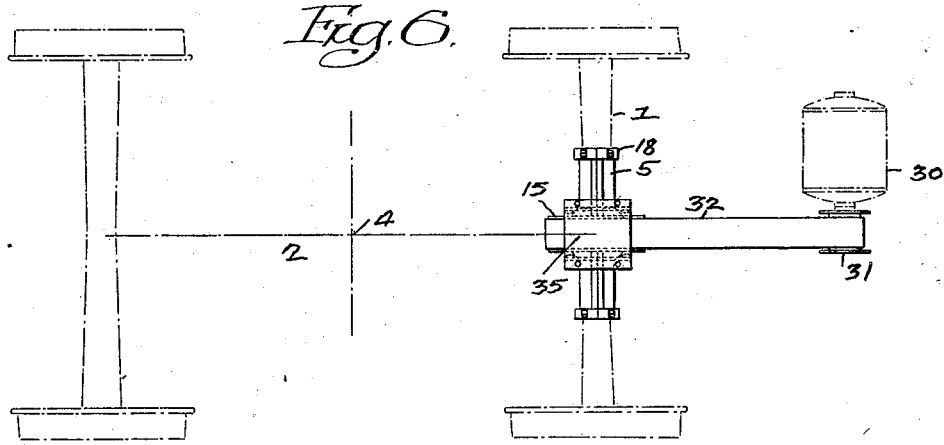
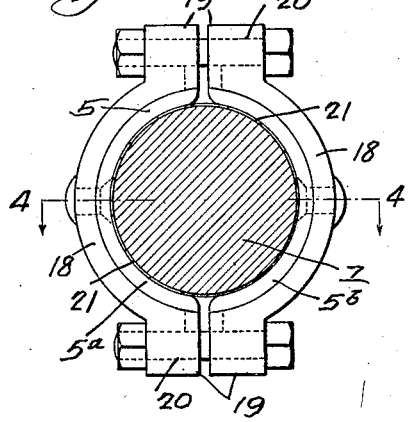
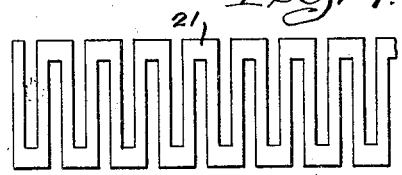
Inventor—
Thomas Crawford.
by his Attorneys—
Howson & Howson May 10, 1927.
T. CRAWFORD
1,628,491
UNIVERSAL PULLEY
Filed Sept. 29, 1926
3 Sheets-Sheet 3
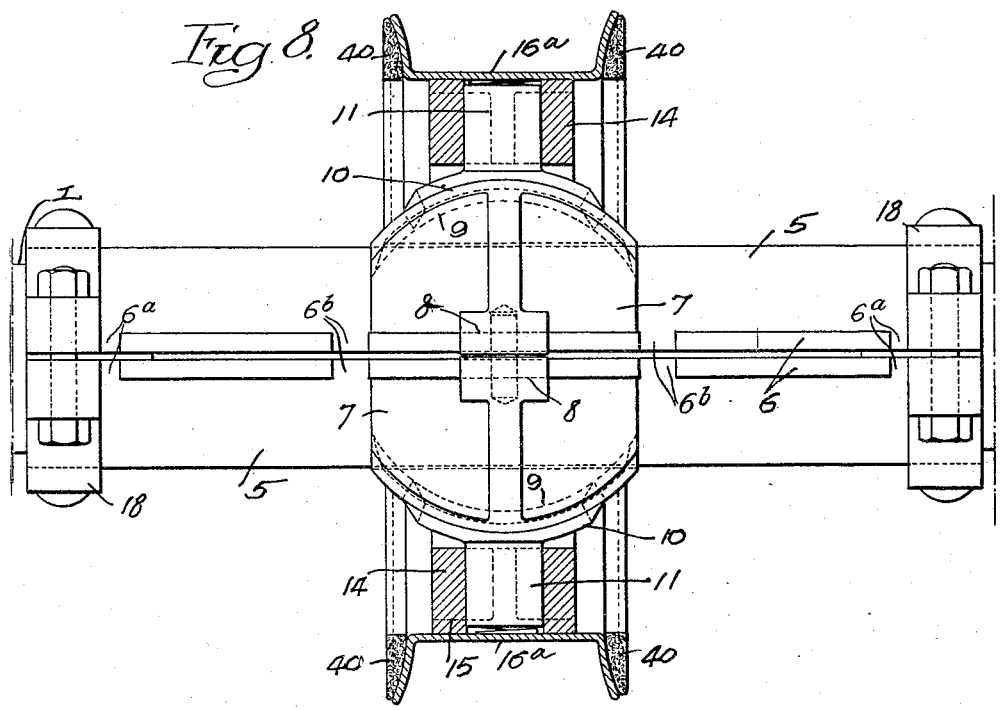
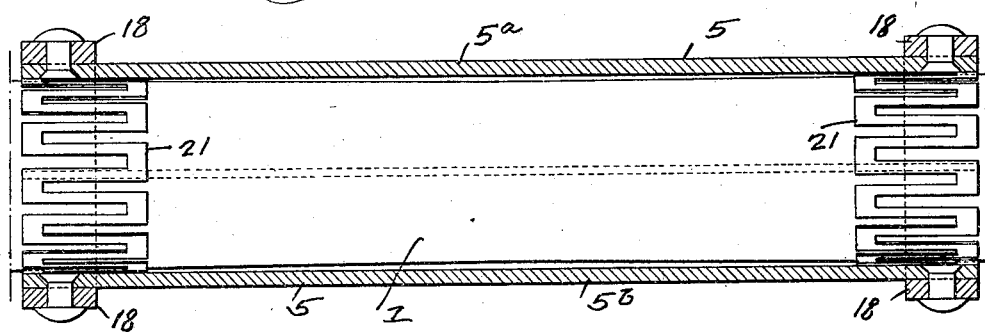
Inventor—
Thomas Crawford.
by his Attorneys.
Howson + Howson Patented May 10, 1927.

1,628,491

UNITED STATES PATENT OFFICE.

THOMAS CRAWFORD, OF PHILADELPHIA, PENNSYLVANIA.

UNIVERSAL PULLEY.

Application filed September 29, 1926. Serial No. 138,487.

My invention relates to pulleys such as those used in driving the electric lighting generator of a railway passenger car from one of the axles embodied in the supporting trucks thereof, and wherein the generator is mounted on the car proper, independent of said trucks.

This present application for United States Letters Patent constitutes a continuation in part of my prior application for United States Letters Patent, filed January 20, 1926, Serial Number 82,595.

The principal object of my invention is to provide a pulley of the universal type which will permit rotation of the car truck around its vertical axis without disturbing the alignment of the driving belt between the driving pulley on the axle of said truck and the pulley secured to the shaft of the generator. It will be understood that my invention is not limited to this particular application, as the invention may be used in any instance where a universal movement of the pulley with respect to its driving shaft is desired.

Other objects and advantages of my invention will be more fully set forth hereinafter and as illustrated in the accompanying drawings, wherein:

Fig. 1 is a side elevation partly in section taken on the line 1—1 of Fig. 2, and illustrating the preferred form of my invention;

Fig. 2 is a sectional plan view taken on the line 2—2 of Fig. 1;

Fig. 3 is a detail sectional view of the invention taken on the line 3—3 of Fig. 2;

Fig. 4 is a section on the line 4—4 of Fig. 3.

Fig. 5 is a diagrammatic side elevation showing my improved pulley as applied to one axle of a supporting truck of a railway passenger car, and driving the electric lighting generator which is mounted on the under part of said passenger car in the usual manner;

Fig. 6 is a diagrammatic plan view of the mechanism shown in Fig. 5.

Fig. 7 is a view of a detail of the invention, and

Fig. 8 is a view similar to Fig. 2, but showing a modified form of the invention.

In the drawings: 1 indicates, in the present instance, an axle of a truck 2 adapted to support one end of a railway passenger car 3, and to rotate about a vertical axis 4 in the usual manner.

Suitably secured to the shaft 1 is a sleeve 5 which is provided with longitudinally extending flanges 6, 6. Slidably mounted on the sleeve 5 is an intermediate member 7 having a pair of longitudinally extending grooves 8, 8, the sides of which are adapted to engage the flanges 6, 6 of the sleeve 5, by means of which the member 7 is splined to the shaft or axle 1.

The member 7 is provided with a pair of grooves 9, 9 arcuate in form and disposed in a plane extending longitudinally of said shaft, into which project shoes or pivot members 10, 10.

The shoes 10, 10 are provided with projecting lugs or trunnions 11, 11, and each trunnion is counterbored, as at 12, for the reception of a coiled spring 13. Each lug or trunnion 11 is journaled in a bearing 14 integrally constructed with a pulley ring 15 having a crowned face 16.

In the present instance, the sleeve 5 is in split form, being composed of two identical members $5^a$ and $5^b$. Each of the members $5^a$ and $5^b$ is provided, adjacent its respective ends, with a semi-annular clamping member 18 provided with extending lugs 19, 19. A liner 21 of relatively thin material, and formed, as shown in Fig. 7, is positioned adjacent each end of the sleeve 5 intermediate the said sleeve and the shaft 1, and bolts 20, 20 extend through apertures in the said lugs 19, 19 and provide means whereby the members $5^a$ and $5^b$ of the sleeve 5 may be drawn tightly on the liners 21 which are subsequently drawn against the shaft 1 whereby the sleeve 5, liners 21 and the shaft 1 move as a unit. The liners 21 permit normal flexing of the axle 1 intermediate the ends of the sleeve 5.

The splines 6, 6 are removed at each end adjacent the collars 18, as shown at $6^a$, to prevent the packing of dirt, ice particles or other matter from accumulating in the corners which would otherwise be formed at the juncture of these two elements when the intermediate member 7 would be moved longitudinally of the shaft 1.

The member 7 likewise is in split form, being composed of two identical sections $7^a$ and $7^b$. In order to preserve perfect alignment between the members $7^a$ and $7^b$ each of said members is provided respectively with an outwardly extending dowel pin 22 and has an opening 23, adapted to receive the dowel 22 of the opposite member.

The pulley ring 15 is likewise split and composed of members 15ª and 15ᵇ which are secured together, as shown in Fig. 1, by means of stud bolts 24, 24 projecting from each of the members 15ª and 15ᵇ, and extending into an opening 25 provided in the opposite member, in alignment with the respective stud bolt 24. In each instance, a nut 26 is adapted to the stud bolt 24 by means of which the members 15ª and 15ᵇ are rigidly secured together.

This split construction is necessary in order that the elements may be secured to the axle 1, but it will be understood that in cases where a straight, through shaft is to be used in conjunction with my improved universal pulley it will not be necessary to form all the members in this manner, and also in such instances the split sleeve 5 may be dispensed with and the member 7 splined directly to the shaft 1.

Upon reference to Fig. 1, it will be noted that the springs 13 are confined between the base of the counterbore 17 which accommodates the trunnions 11 in the bearings 14 and the base of the counterbore 12 of each of the trunnions 11, and exert sufficient pressure upon the member 7, through the shoes 10, to stabilize the pulley with respect to the shaft 1.

As shown in Fig. 5, a generator 30 is suitably mounted on the under portion of the railway passenger car 3 in the usual manner, and is provided with a pulley 31 adapted to be rotated by means of a belt 32 from the pulley 15 secured to the axle 1, as clearly shown in said figure.

As shown in Fig. 6, should the truck 2 turn upon its vertical axis, as in rounding a curve of a railway track, the axle 1 of said truck will be moved out of parallel alignment with the shaft of the generator 30, which is its normal relative position of operation.

Under the present method of operation such misalignment causes a strain to be placed upon first one edge of the belt and then upon the other edge, depending upon the direction in which the truck happens to turn which, being continuously repeated, in time causes the belt to become stretched along its edges and eventually broken or thrown off either the pulley 31 or the pulley 15, causing the lighting system of the car to be forced out of operation.

With my present invention the misalignment, as above noted, is provided for by means of my improved universally mounted pulley which will permit relative angular and longitudinal movement of the axle 1 with respect to the shaft of the generator and maintain a true operative alignment between the belt 32 and the pulleys 15 and 31.

The angular movement of the axle 1 will be absorbed by the shoes 10, 10 sliding in the groove 9 of the member 7, which constitutes a pivot for oscillation of the pulley ring 15 in one plane extending longitudinally of the shaft 1, said pivot extending transversely of said shaft; and by means of the trunnions 11, 11 and the bearings 14, 14, which constitute a second pivot extending transversely of the shaft 1 and at right angles to the first mentioned pivot, longitudinal oscillation of the pulley 15 with respect to the shaft 1, in a plane at right angles to the longitudinal oscillation provided by the shoes 10, 10 sliding in the arcuate groove 9 of the intermediate member 7, is permitted.

It will be understood that the two transversely extending pivots radiate from a common centre coincident with the centre of the axle or shaft 1, thus a universal movement of the pulley ring 15, with respect to the shaft 1, is obtained.

The longitudinal movement of the pulley 15, with respect to the shaft or axle 1, is provided for by means of the intermediate member 7 being slidably mounted on the sleeve 5 and through the medium of the flanges 6, 6, and the grooves 8, 8 coordinate rotation of the pulley 15 and the shaft 1 is at all times assured.

The relative angular and longitudinal movement between the axle 1 and the shaft of the generator 30 causes a fluctuation in the distance between the centres of the two elements and such irregularity is absorbed by means of a spring 33 which causes the generator to swing on its supporting bolt 34 in the usual manner, as shown in Fig. 5, which maintains the belt 32 in a taut condition at all times.

To insure the pulley ring 15 of maintaining a vertical alignment with the pulley 31 and also to insure the sliding of the intermediate member 7 of the pulley upon the sleeve 5 when necessity arises, I provide a forked guide member 35 which is secured to the underside of the car 3.

The forked guide member 35 is provided on each side of the pulley with two depending arms 36, 36 which extend one on each side of the shaft 1 and engage the pulley ring 15. The forked guide member comprises a plate 37 having integral flanges 38, 38 to which the arms 36, 36 are pivoted at 39, securing screws 39ª passing through the flanges 38 and being tapped into the arms 36. The arms, by removing the screws 39ª may be swung on their pivots 39, for obvious reasons when desired.

The arms 36 steady the pulley ring 15, and act to maintain the belt 32 on the crowned face 16 thereof, further functioning to maintain true alignment of the pulley ring 15, the belt 32 and the pulley 31 of the generator. In order to protect the edges of the belt from injury, the arms 36, 36 are flared outwardly in both directions from their centres, which provide a lead-in for the belt regardless of the direction in which the car 3 may be traveling.

Intermediate the edges of the pulley ring 15 and the arms 36, 36, I provide a wear ring 40 of fibre or other suitable material which also functions to prevent noises of metal rattling against metal, as shown in the drawings. The wear rings 40 are secured by screws or other fastening means 41 to annular inturned flanges 42 formed integral adjacent the opposite edges of the pulley ring 15.

The liners 21 may be of any suitable material or construction. I prefer to make the liners in the form shown in Fig. 7, bending the otherwise flat yielding member around the shaft and placing it within and adjacent the ends of the sleeve 5, with one edge of each of the said members substantially flush with the respective end of the device.

In Fig. 8, the pulley ring is shown as having a flanged rim 16$^a$ in place of the crowned face 16, and the wear rings 40 secured to the flanges of the rim. In this figure, the splines 6, 6 are shown as being interrupted at 6$^b$ to permit the dirt and ice to be cleared therefrom in a manner already described above, relative to the clearing openings 6$^a$ which also appear in the figure in addition to the openings 6$^b$.

While I have shown and described my improved universal pulley as the driving element, obviously, under other circumstances than those illustrated in the drawing, the universal pulley may be attached to the driven shaft, with equal efficiency of operation, which may be positioned in a vertical or other angularly disposed plane. The pulley rim may also be replaced by a gear or sheave ring, and be driven in any desired manner.

Other equivalent elements may be provided for accomplishing the result I obtain, without departing from the essential features of my invention, and while I have shown but one application involving the principles of the invention it is not to be construed as limiting the invention to the form illustrated, and I, therefore, desire that only such limitations be placed thereon as are prescribed in the appended claims and necessitated by the prior art of record.

I claim:

1. In combination with a railway passenger car having a body, a supporting truck pivotally connected to said body, an axle included in the elements of said truck, a resiliently pivoted electric generator on said body, and a driven pulley secured to the shaft of said generator; a longitudinally slidable universal driving pulley on said axle, a belt operatively connecting said pulleys; and means on the said body and engaging the driving pulley for maintaining true operative alignment between said belt and said pulleys, when said truck is moving on a curve and whereupon said truck axle assumes an angular position and moves longitudinally with respect to the shaft of said generator.

2. The combination of a driven shaft rotatably mounted in substantially fixed bearings secured to a rigid frame; a driving shaft capable of universal and longitudinal movement, with respect to said driven shaft; a pulley secured to said driven shaft; a pulley on said driving shaft and adapted to be coordinately rotated therewith; a belt operatively connecting said pulleys; and means on said rigid frame and engaging the driving pulley for maintaining true operative alignment between said belt and said pulleys, regardless of the angular and longitudinal misalignment assumed by said driving shaft with respect to said driven shaft, within the limits prescribed by the apparatus in which said elements are included.

3. The combination of a shaft; a universal pulley slidably connected to said shaft in a manner to be coordinately rotated therewith; means intermediate said shaft and said pulley and including a pivot whereby oscillation of said pulley, longitudinally of said shaft, about a centre extending transversely of said shaft, is permitted; and means including a second pivot whereby oscillation of said pulley, longitudinally of said shaft, about a centre extending transversely of said shaft and at right angles with respect to the first mentioned centre of oscillation, is permitted, whereby universal movement of said pulley with respect to said shaft is obtained.

4. The combination of a shaft; a pulley; an intermediate member splined to said shaft; a pivot for said pulley on said intermediate member and extending transversely of said shaft; and means including a second pivot for said pulley extending transversely of said shaft and at right angles to the first mentioned pivot, whereby universal and longitudinal movement of said pulley with respect to said shaft and coordinate rotation between said pulley and said shaft are obtained.

5. The combination of a shaft; a pulley; an intermediate member splined to said shaft; an arcuate groove formed in said intermediate member and disposed in a plane extending longitudinally of said shaft; shoes, slidably mounted in said arcuate groove, constituting a pivot for said pulley extending transversely of said shaft; and means including a second pivot for said pulley extending transversely of said shaft and at right angles to the first mentioned pivot, whereby universal and longitudinal movement of said pulley with respect to said shaft and coordinate rotation of said pulley and said shaft are obtained.

6. The combination of a shaft; a pulley; an intermediate member splined to said shaft; pivot members mounted on said intermediate member and adapted to oscillate thereon; trunnions formed on said pivot members; a pulley ring; bearings on said ring adapted to receive said trunnions; a counterbore in each of said trunnions; a spring confined in each of said counterbores, between the base thereof and the base of each of said bearings on said ring.

7. The combination of a shaft; a split sleeve comprising a pair of identical members on said shaft; semiannular clamping members secured to said split sleeve members; bolts for securing said clamping members to said shaft; an intermediate member; flanges on said split sleeve constituting splines for said intermediate member; pivot members on said intermediate member; trunnions on said pivot members; a pulley ring; bearings on said ring adapted to receive said trunnions; and springs between said pivot members and said pulley ring.

8. The combination of a shaft; a split sleeve secured to said shaft; an intermediate member split through its centre and composed of a pair of identical portions and splined to said sleeve; a protruding dowel in each of said portions; an aperture in each portion adapted to receive the protruding dowel of the opposite portion; pivot members on said intermediate member; trunnions on said pivot members; a split pulley ring; means for securing the separate portions of said ring together as a unit; bearings on said ring for said trunnions; and springs between said ring and said pivot members; whereby pressure is exerted through said pivot members to said intermediate member and the individual parts thereof held in firm contact with the cooperating portions of the split sleeve.

9. The combination of a driving shaft; a driven shaft; a rigid driven pulley secured to said driven shaft; a driving pulley on said driving shaft; means within the driving pulley for permitting said driving shaft to receive a universal and a longitudinal movement with respect to said driving pulley; a belt operatively connecting said driving and said driven pulleys; and a guide member engaging said driving pulley, whereby said driving pulley is held in true operative alignment with said rigid driven pulley.

10. The combination of a shaft; a split sleeve comprising a pair of identical members on said shaft; semiannular clamping members secured to said split sleeve members; bolts for securing said clamping members to said shaft; liners intermediate said sleeve and said shaft; an intermediate member; flanges on said split sleeve constituting splines for said intermediate member; pivot members on said intermediate member; trunnions on said pivot members; a pulley ring; bearings on said ring adapted to receive said trunnions; and springs between said pivot members and said pulley ring.

11. The combination of a driving shaft; a driven shaft; a rigid pulley secured to one of said shafts; a flexible pulley on the other of said shafts; means within the flexible pulley for permitting its said shaft to receive a universal and a longitudinal movement with respect to said flexible pulley; a belt operatively connecting said flexible and said rigid pulleys; a guide member engaging said flexible pulley, whereby said flexible pulley is held in true operative alignment with said rigid pulley; and wear rings on said flexible pulley adapted to engage said guide member.

12. The combination of an outer rotary member; means for maintaining said member in a single plane of rotation; and a shaft universally connected to said rotary member and longitudinally slidable therein.

13. The combination of an outer rotary member; means for maintaining said member in a single plane of rotation; a shaft mounted in said rotary member; and an intermediate member splined to said shaft and universally connected to said rotary member, whereby said shaft is capable of universal movement within said rotary member and is adapted to slide longitudinally within said intermediate member.

THOMAS CRAWFORD.